U S010468969B2

(12) United States Patent
Knudsen et al.

(10) Patent No.: US 10,468,969 B2
(45) Date of Patent: Nov. 5, 2019

(54) ELECTRONIC CIRCUIT AND METHOD FOR OPERATING AN ELECTRONIC CIRCUIT

(71) Applicant: GRUNDFOS HOLDING A/S, Bjerringbro (DK)

(72) Inventors: Jan Knudsen, Østbirk (DK); Niels Høgholt Petersen, Bjerringbro (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 0 days.

(21) Appl. No.: 15/382,037

(22) Filed: Dec. 16, 2016

(65) Prior Publication Data

US 2017/0179811 A1 Jun. 22, 2017

(30) Foreign Application Priority Data

Dec. 17, 2015 (EP) ..................................... 15200688

(51) Int. Cl.
*H02M 1/32* (2007.01)
*H02M 7/04* (2006.01)
*H02H 9/00* (2006.01)

(52) U.S. Cl.
CPC .............. *H02M 1/32* (2013.01); *H02H 9/001* (2013.01); *H02M 7/04* (2013.01)

(58) Field of Classification Search
CPC .......... H02M 1/32; H02M 7/04; H02H 9/001; G11B 9/02; G11C 11/22; G11C 11/2275; G11C 13/04; G11C 13/048
See application file for complete search history.

(56) References Cited

U.S. PATENT DOCUMENTS

| 6,111,739 | A | 8/2000 | Wu et al. |
| 8,482,944 | B1 * | 7/2013 | Fukuda ................. H02H 9/002 |
| | | | 323/222 |
| 9,281,758 | B1 * | 3/2016 | Wang ..................... H02M 7/062 |
| 9,513,681 | B2 * | 12/2016 | Wang ....................... G06F 1/263 |
| 2002/0196644 | A1 * | 12/2002 | Hwang ............... H02M 1/0845 |
| | | | 363/89 |

(Continued)

FOREIGN PATENT DOCUMENTS

CN  101515758 A  8/2009
CN  104485196 B  11/2016

(Continued)

*Primary Examiner* — Emily P Pham
*Assistant Examiner* — Demetries A Gibson
(74) *Attorney, Agent, or Firm* — McGlew and Tuttle, P.C.

(57) ABSTRACT

An electronic circuit (1), in particular DC-link circuit, has a high side DC voltage level, an input and an output, the electronic circuit comprising a DC-link capacitor (4), an inrush circuit (3), for limiting an input current to a predetermined level, connected between a supply line (6) of the DC-link capacitor and the input. The inrush circuit includes a charge resistor element (Rc), a switch element (9), connected in parallel with the charge resistor element, and a control (7, 8) controlling the switch element. The control is adapted to turn the switch element on when the input current falls below a predetermined current level. The control includes a trigger control element (8) adapted to detect a differential voltage across the switch element and to turn the switch element off when the detected differential voltage rises above a predetermined threshold voltage. A method is provided for operating the electronic circuit (1).

20 Claims, 2 Drawing Sheets

(56) References Cited

U.S. PATENT DOCUMENTS

| | | | |
|---|---|---|---|
| 2006/0050541 A1* | 3/2006 | Terdan | H02H 9/001 |
| | | | 363/70 |
| 2009/0212726 A1 | 8/2009 | Baudesson et al. | |
| 2009/0295778 A1* | 12/2009 | Maehara | H05B 33/0896 |
| | | | 345/213 |
| 2012/0026761 A1* | 2/2012 | Young | H02M 7/125 |
| | | | 363/44 |
| 2012/0194090 A1* | 8/2012 | Esaki | H02M 3/156 |
| | | | 315/200 R |
| 2014/0292219 A1* | 10/2014 | Suzuki | H02M 7/125 |
| | | | 315/287 |
| 2015/0124499 A1 | 5/2015 | Eum et al. | |
| 2015/0162819 A1* | 6/2015 | Nguyen | H02M 1/32 |
| | | | 363/50 |
| 2015/0357910 A1* | 12/2015 | Murakami | H05B 33/0815 |
| | | | 363/89 |
| 2017/0141565 A1* | 5/2017 | White | H02H 9/001 |
| 2017/0215241 A1* | 7/2017 | Long | H05B 33/0815 |
| 2017/0271867 A1* | 9/2017 | Hamada | H02M 1/32 |

FOREIGN PATENT DOCUMENTS

| | | |
|---|---|---|
| EP | 0 591 915 A2 | 4/1994 |
| GB | 2 310 328 A | 8/1997 |
| GB | 2310328 B | 10/1999 |
| JP | S63 178759 A | 7/1988 |
| JP | 2005 198357 A | 7/2005 |
| RU | 2319269 C1 | 3/2008 |

\* cited by examiner

ELECTRONIC CIRCUIT AND METHOD FOR OPERATING AN ELECTRONIC CIRCUIT

CROSS REFERENCE TO RELATED APPLICATIONS

This application claims the benefit of priority under 35 U.S.C. § 119 of European Application 15 200 688.8 filed Dec. 17, 2015, the entire contents of which are incorporated herein by reference.

FIELD OF THE INVENTION

The present invention relates to an electronic circuit in particular a DC-link circuit, having a high side DC voltage level, an input and an output, a DC-link capacitor and an inrush circuit for limiting an input current to a predetermined level, and the present invention relates to a method for operating the electronic circuit.

BACKGROUND OF THE INVENTION

Electronic circuits comprise amongst others frequency converters which are used in electro-mechanical drive systems for generating, from an alternating current (AC), an alternating current with varying frequency and amplitude for the direct power supply of electrical machines, as for example, three-phase motors.

Although other configurations are also known in prior art, typically, such frequency converters consist of an input circuit for rectifying a mains AC current, an intermediate circuit, and a power circuit comprising semiconductor switches which generate the power supply having a required frequency and amplitude.

Further, a capacitor is implemented in such frequency converters which actually represents the power storage and which is connected downstream of the rectifier. It is also known in prior art to provide a voltage limiter in the intermediate circuit, wherein the higher a voltage applied to the electronic circuit, the lower its resistance will become. However, such a voltage limiter is only effective with high voltages above 450 Volt, and its response time is rather slow.

Moreover, it is known in prior art to limit the current in the intermediate circuit to a predetermined maximum inrush limit, when the intermediate circuit capacitor is being charged. This typically is achieved by a resistor having a high resistance. Due to the losses entailed by implementing the above mentioned resistor with high resistance, the latter is only activated in case it is actually needed. Otherwise, it is always short-circuited. The short-circuit is effected by an electronic switch element, the switch element could advantageously be a gated gallium nitride or silicon based semiconductor device with a mainly resistive ON characteristic as for example, a MOSFET (Metal-Oxide Semiconductor Field-Effect Transistor), which short-circuits the resistor depending on the current.

Most MOSFETS, however, although being rather inexpensive, are only able to operate in linear mode for a short period of time. Therefore, the voltage over the switch element has to be measured. If the voltage rises above a certain threshold voltage value, then the switch has to open, because of protection of the switch element.

SUMMARY OF THE INVENTION

Therefore, it is an object of the present invention to provide an electronic circuit and a corresponding method for operating an electronic circuit according to which operation of an electronic switch element in linear mode is reduced to a minimum time period.

According to the present invention, an electronic circuit, in particular DC-link circuit, is provided having a high side DC voltage level, an input and an output, the electronic circuit comprising a DC-link capacitor, an inrush circuit for limiting an input current to a predetermined level, wherein the inrush circuit is connected between a supply line of the DC-link capacitor and the input, the inrush circuit comprising a charge resistor element, a switch element connected in parallel with the charge resistor element, and a control means for controlling the switch element wherein the control means is adapted (configured) to turn on the switch element when the input current falls below a predetermined current level, wherein the control means further comprises a trigger control element which is adapted (configured) to detect a differential voltage across the switch element and to turn the switch element off when the detected differential voltage rises above a predetermined threshold voltage.

By the inventive configuration of an electronic circuit, an instant trigger reaction is enabled by means of which the electronic switch element is turned off in only a few hundred nanoseconds, thereby preventing the electronic switch element from being operated in linear mode longer than necessary. Moreover, the inventive circuit reduces the charge current flowing to the DC-link capacitor, and it prevents surge voltage applied to the input terminals from charging the DC-link capacitor. Thereby, the DC-link capacitor and its connected electronic circuits are protected from being subject to overvoltage.

A further advantage of the electronic circuit according to the present invention is that the intermediate circuit is scalable from a few watt to several hundred watt, thus, extending its application range substantially. Also, the intermediate circuit of the electronic circuit according to the present invention has very low power consumption as well as very low power loss. It operates autonomously and does not depend on any other control circuits.

According to a preferred embodiment of the invention, the inrush circuit is connected to a negative supply line of the DC-link capacitor. By connecting the inrush circuit to the negative supply line of the DC-link capacitor, the electronic circuit may be implemented with individual components, in particular, NPN transistors which are rather inexpensive compared to, e.g., other transistors, as for example, PNP transistors.

According to a further preferred embodiment, the input of the inrush circuit is connected to a bridge rectifier.

Moreover, the electronic circuit may further comprise a voltage limiter.

The control means could be implemented in a micro controller as part of a software solution, but preferably implemented as a control circuit.

According to yet another preferred embodiment, the control circuit further comprises a current supervisory circuit.

Preferably, the trigger control element comprises a voltage trigger circuit.

It is also advantageous, if the voltage limiter is a voltage dependent resistor which is adapted and arranged so as to protect the bridge rectifier and the inrush circuit and the DC-link capacitor from overvoltage.

The switch element may be supplied from the high side DC voltage level, and a control input for the switch element may be limited to a predetermined voltage level.

According to another preferred embodiment, the current supervisory circuit comprises a first resistance, a second resistance, a third resistor, a first transistor, and an NTC resistor.

Also, the trigger control element may comprise a fourth resistance, a fifth resistance, and a second transistor.

The switch element may be a third transistor.

Preferably, the switch element is a MOSFET, and is adapted to operate in a linear mode, and wherein the trigger control element is adapted (configured) to turn the switch element off if the drain source voltage of the MOSFET exceeds a predetermined voltage limit.

Moreover, the current supervisory circuit may be adapted (configured) to pull down a gate voltage at the switch element, which will then operate in the linear mode.

According to a further preferred embodiment, the second resistance, and the NTC resistor operate so as to temperature-compensate a threshold voltage of a base-emitter of the first transistor.

According to still a further embodiment, the second transistor is adapted to monitor the drain-source voltage of the third transistor, and wherein the second transistor is adapted to turn on and pull down the gate voltage of the third transistor, if the voltage over the fourth resistance exceeds a threshold value of a base emitter of the second transistor.

Further, according to the invention, a method for operating an electronic circuit is provided, wherein the switch element is controlled so as to turn off, if the trigger control element detects a differential voltage across the semiconductor switch which has risen above a predetermined threshold voltage. The method for operating an electronic circuit according to the invention provides for the advantages already discussed above in connection with the inventive electronic circuit, in particular, it enables for an electronic switch to be switched off in a particularly short time, namely, within only a few hundred nanoseconds.

Further details and features of the invention as well as concrete embodiments of the invention can be derived from the following description in connection with the drawing, The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
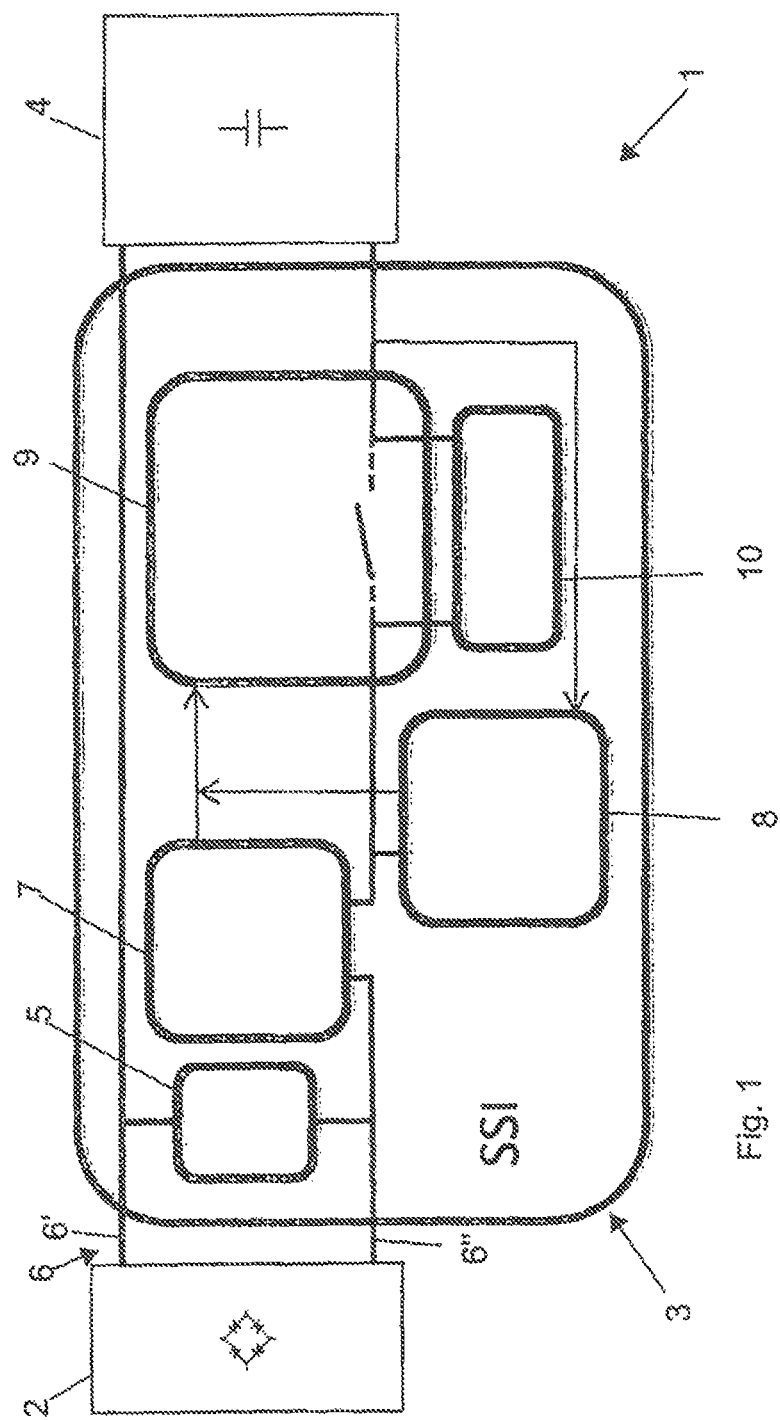
FIG. 1 is a schematic illustration of an electronic circuit according to a preferred embodiment.
Figure 2:
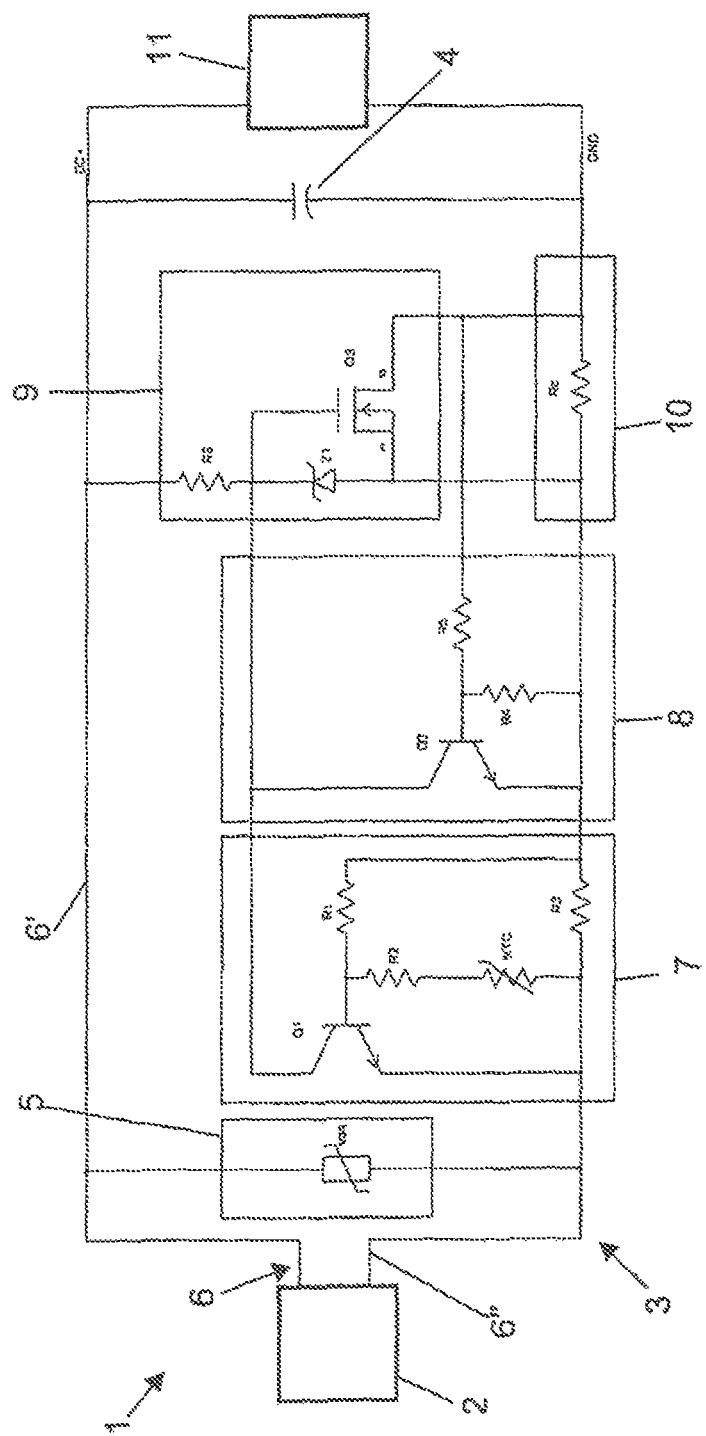
FIG. 2 is a circuit diagram of the electronic circuit shown in FIG. 1.

Referring to the drawings, FIG. 1 shows a schematic illustration of the electronic circuit according to a preferred embodiment; and FIG. 2 shows a circuit diagram of the electronic circuit shown in FIG. 1.

FIG. 1 shows a schematic illustration of an electronic circuit 1 according to a preferred embodiment which here is configured as a DC-link circuit. As can be seen, the electronic circuit 1 basically comprises three main units: a bridge rectifier 2 for converting an alternating current (AC) input into a direct current (DC) output with full-wave rectification, an intermediate or inrush circuit 3, and a power circuit comprising a DC-link capacitor 4 and connected electronic load circuits not further shown here.

Further, the inrush circuit 3, which is connected between the bridge rectifier 2 and the DC-link capacitor 4, comprises a voltage limiter in a form of a voltage dependent resistor (VDR) 5 for limiting the input current to a predetermined level. Moreover, an electronic switch 9 as a switch element, here a MOSFET, a charge circuit 10 as a charge resistor element, a current supervisory circuit 7 and a voltage trigger circuit 8 as a control means (switch control) for controlling the switch element are comprised in the inrush circuit 3 which will be explained in further detail in connection with FIG. 2 below. All components of the inrush circuit 3 in the example shown here are connected to the negative supply line 6" of the DC-link capacitor 4. This has the advantage that individual components, in particular, NPN transistors, may be used which are less expensive than, e.g., PNP transistors which would have to be used otherwise, if the components mentioned above would be connected to the positive supply line 6'. However, the above mentioned components of the inrush circuit 3 may nevertheless be implemented in the positive supply line 6', if needed.

FIG. 2 shows a circuit diagram of the electronic circuit 1 shown in FIG. 1. As can be seen, on the input side, there is arranged the bridge rectifier 2 connected to the inrush circuit 3 and the DC-link capacitor 4 on the output side of the electronic circuit 1. The voltage limiter, namely, VDR 5 is connected between a supply line 6 of the DC-link capacitor 4 and an input of the electronic circuit 1 so as to protect both the front connected bridge rectifier 2 and the following circuits, and in particular, the DC-link capacitor 4 from overvoltage.

Downstream of the VDR 5, there is further connected in the negative supply line 6" the current supervisory circuit 7, the voltage trigger circuit 8, the electronic switch 9, the charge circuit 10, as well as the DC-link capacitor 4 and an output load 11 which will be explained in further detail below.

The current supervisory circuit 7 comprises a first resistor R1, a second resistor R2, a third resistor R3, a first transistor Q1, and a negative temperature coefficient thermistor NTC. The third resistor R3 is a shunt resistor for measuring the current flowing through inrush circuit 3. The voltage trigger circuit 8 comprises a second transistor Q2, a fourth resistor R4, and a fifth resistor R5. The electronic switch 9 comprises a third transistor Q3, a sixth resistor R6, and a Zener diode Z1, while the charge circuit 10 comprises a charge resistor Rc.

The inrush circuit 3 functions as follows: Current passing through resistor R6, will start to turn on third transistor Q3. At the same time the input voltage starts to charge the capacitor 4 through both the charge resistor Rc and the turned on transistor Q3. Current passing through the capacitor 4 will provide a predetermined voltage across the resistor R3 which will then cause a voltage across the first resistor R1 and across the first transistor Q1. When the base-emitter voltage of the first transistor Q1 reaches a predetermined threshold value, a current will be allowed to flow through the base emitter of the first transistor Q1 and the latter will be turned on. The collector of the first transistor Q1 will pull down the gate voltage at a third transistor Q3, and the third resistor R3 will start to turn off while it enters the linear mode. The second resistor R2 and the NTC resistor will temperature-compensate the threshold voltage of the base emitter of first transistor Q1.

The second transistor Q2 monitors the drain-source voltage of the third transistor Q3 which is attenuated by the fourth resistor R4 and the fifth resistor R5. The second transistor Q2 will start to turn on, when the voltage across the fourth resistor R4 reaches the threshold voltage of the base emitter of the second transistor Q2. The collector of the second transistor Q2 will pull down the gate voltage of the third transistor Q3. Thus, an instant trigger reaction will start turning the third transistor Q3 off only within an instant of time, namely, within a few hundred nanoseconds. The voltage trigger circuit 8 thereby prevents the third transistor Q3 from staying in the linear mode.

Moreover, the third transistor Q3 is the power switch which is always on during normal operation of the electronic circuit 1. However, when turning the electronic circuit 1 on, at power-up, the third transistor Q3 will be switched off by the first transistor Q1, as described above. This serves as inrush protection and protection of an AC-input overvoltage, as, for example, a surge voltage. The sixth resistor R6 then provides positive supply current to the gate of the second transistor Q2, whereby the Zener diode Z1 will limit the gate voltage.

Further, the charge resistor Rc which is responsible for charging the DC-link capacitor 4 will only charge the latter, when the third transistor Q3 is turned off.

During normal operation will the transistor be fully turned on, as the current through the resistor R3 is below the predetermined maxi-mum inrush limit.

If a high voltage surge pulse is applied to the input during normal operation the surge pulse will try to charge the capacitor 4 with the high voltage surge pulse, the current through the capacitor 4 will reach the maximum inrush limit, and as described earlier the Q3 transistor will be tuned off. Then the high voltage surge pulse will try to charge capacitor 4 through resistor Rc. Now the charging of the capacitor 4 will take much longer time compared to when the transistor Q3 was turned on. This longer charging time will give the voltage limiter the time to react. The voltage limiter will remove the high voltage surge pulse and the capacitor 4 will not be charged with the high voltage surge pulse.

The combination of the inrush circuit and the voltage limiter will ensure a fast reaction to high voltage surge pulse and protect the rectifying bridge and capacitor 4 from a damaging overvoltage.

While specific embodiments of the invention have been shown and described in detail to illustrate the application of the principles of the invention, it will be understood that the invention may be embodied otherwise without departing from such principles.

APPENDIX

Reference Numerals 1 electronic circuit
2 bridge rectifier
3 intermediate or inrush circuit
4 DC-link capacitor
5 voltage dependent resistor (VDR)
6 supply line (6' positive supply line, 6" negative supply line)
7 current supervisory
8 voltage trigger circuit
9 electronic switch
10 charge circuit
11 output load
Q1 first transistor
Q2 second transistor
Q3 third transistor
R1 first resistor
R2 second resistor
R3 third resistor
R4 fourth resistor
R5 fifth resistor
R6 sixth resistor
Rc charge resistor
Z1 Zener diode

What is claimed is:

1. An electronic circuit forming a DC-link circuit with a high side DC voltage level, an input and an output, the electronic circuit comprising:
   a DC-link capacitor;
   a DC-link capacitor supply line; and
   an inrush circuit limiting an input current to a predetermined current level, wherein the inrush circuit is connected between the DC-link capacitor supply line and the input, the inrush circuit comprising a charge resistor element, a switch element connected in parallel with the charge resistor element, and a control means for controlling the switch element, wherein the control means is configured to turn the switch element on when the input current falls below the predetermined current level, the control means further comprising a trigger control element configured to detect a differential voltage across the switch element and to turn the switch element off when the detected differential voltage rises above a predetermined threshold voltage, the control means further comprising and a current supervisory circuit, wherein the current supervisory circuit is adapted to pull down a gate voltage at the switch element when the input current exceeds the predetermined current level, which switch element then operates in the linear mode.

2. An electronic circuit according to claim 1, wherein the inrush circuit is connected to a negative supply line of the DC-link capacitor.

3. An electronic circuit according to claim 1, further comprising a bridge rectifier, wherein the input of the inrush circuit is connected to the bridge rectifier.

4. An electronic circuit according to claim 1, further comprising a voltage limiter.

5. An electronic circuit according to claim 4, further comprising a bridge rectifier, wherein:
   the input of the inrush circuit is connected to the bridge rectifier; and
   the voltage limiter comprises a voltage dependent resistor configured and arranged so as to protect the bridge rectifier and the inrush circuit and the DC-link capacitor from overvoltage.

6. An electronic circuit according to claim 1, wherein the trigger control element comprises a voltage trigger circuit.

7. An electronic circuit according to claim 1, wherein the switch element is supplied from the high side DC voltage level, and wherein a control input for the switch element is limited to a predetermined voltage level.

8. An electronic circuit according to claim 1, wherein the current supervisory circuit comprises a first resistance, a second resistance, a third resistor, a transistor and an NTC resistor.

9. An electronic circuit according to claim 8, wherein the transistor of the current supervisory circuit is a first transistor and the trigger control element comprises a fourth resistance, a fifth resistance, and a second transistor.

10. An electronic circuit according to claim 9, wherein the switch element comprises a third transistor.

11. An electronic circuit according to claim 10, wherein:
the second transistor is adapted to monitor the drain-source voltage of the third transistor; and
the second transistor is adapted to turn on and pull down the gate voltage of the third transistor, if the voltage over the fourth resistance exceeds a threshold value of a base emitter of the second transistor.

12. An electronic circuit according to claim 9, wherein the second resistance and the NTC resistor operate so as to temperature-compensate a threshold voltage of a base-emitter of the first transistor.

13. An electronic circuit according to claim 1, wherein:
the switch element comprises a MOSFET configured to operate in a linear mode; and
the trigger control element is configured to turn the switch element off if a drain source voltage of the MOSFET exceeds a predetermined voltage limit.

14. An electronic circuit according to claim 1, wherein the trigger control element comprises a resistance, another resistance, and a transistor.

15. An electronic circuit according to claim 1, wherein the current supervisory circuit measures the current flowing through the inrush circuit.

16. A method for operating an electronic circuit, the method comprising the steps of:
providing an electronic circuit forming a DC-link circuit with a high side DC voltage level, an input and an output, the electronic circuit comprising a DC-link capacitor, a DC-link capacitor supply line and an inrush circuit limiting an input current to a predetermined current level, wherein the inrush circuit is connected between the DC-link capacitor supply line and the input, the inrush circuit comprising a charge resistor element, a switch element connected in parallel with the charge resistor element, and a switch control means;
controlling the switch element with the switch control means to turn the switch element on when the input current falls below the predetermined current level, the control means further comprising a trigger control element configured to detect a differential voltage across the switch element, the control means further comprising a current supervisory circuit, wherein the current supervisory circuit is adapted to pull down a gate voltage at the switch element when the input current exceeds the predetermined current level, which switch element then operates in the linear mode; and
turning the switch element off when the detected differential voltage rises above a predetermined threshold voltage.

17. An electronic circuit according to claim 16, wherein:
the electronic circuit further comprises a bridge rectifier and a voltage limiter;
the trigger control element comprises a voltage trigger circuit;
the input of the inrush circuit is connected to the bridge rectifier; and
the voltage limiter comprises a voltage dependent resistor configured and arranged so as to protect the bridge rectifier and the inrush circuit and the DC-link capacitor from overvoltage.

18. An method according to claim 16, wherein:
the current supervisory circuit comprises a first resistance, a second resistance, a third resistor, a transistor and an NTC resistor;
the trigger control element comprises a fourth resistance, a fifth resistance, and a second transistor;
the switch element comprises a third transistor in the form of a MOSFET configured to operate in a linear mode; and
the trigger control element is configured to turn the switch element off if a drain source voltage of the MOSFET exceeds a predetermined voltage limit.

19. A method according to claim 16, wherein the current supervisory circuit measures the current flowing through the inrush circuit.

20. An electronic circuit forming a DC-link circuit with a high side DC voltage level, an input and an output, the electronic circuit comprising:
a DC-link capacitor;
a DC-link capacitor supply line; and
an inrush circuit limiting an input current to a predetermined current level, wherein the inrush circuit is connected between the DC-link capacitor supply line and the input, the inrush circuit comprising a charge resistor element, a switch element connected in parallel with the charge resistor element, and a control means for controlling the switch element, wherein the control means is configured to turn the switch element on when the input current falls below the predetermined current level, the control means further comprising a trigger control element configured to detect a differential voltage across the switch element and to turn the switch element off when the detected differential voltage rises above a predetermined threshold voltage, the control means further comprising a current supervisory circuit, the current supervisory circuit being configured to pull down a gate voltage at the switch element such that the switch element operates in the linear mode when the input current exceeds the predetermined current level.

* * * * *